Aug. 31, 1965 A. R. PETERSON 3,204,157
CRYSTAL DIODE HEAT DISSIPATING MOUNTING
Filed Aug. 30, 1960
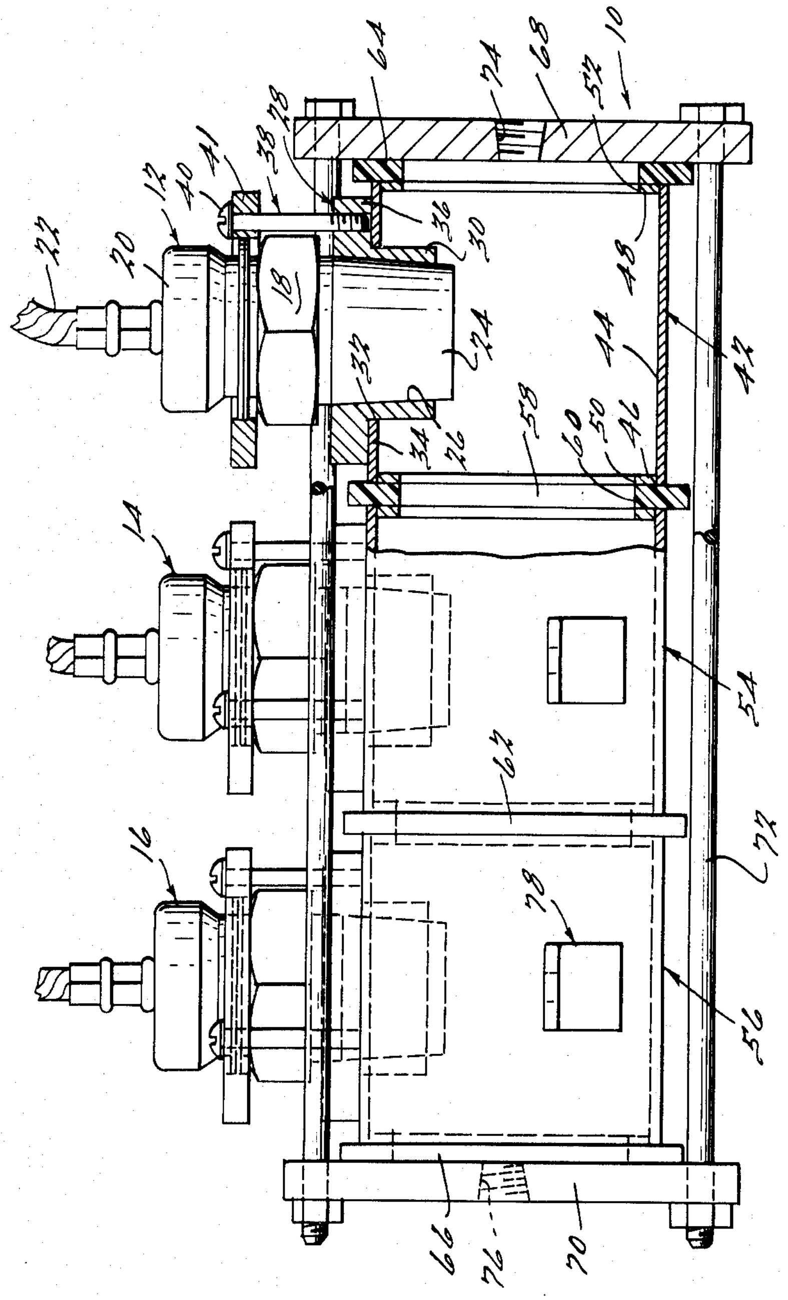
INVENTOR.
Allen R. Peterson
BY
Harness, Dickey + Pierce
ATTORNEYS.

United States Patent Office 3,204,157

Patented Aug. 31, 1965

3,204,157

CRYSTAL DIODE HEAT DISSIPATING MOUNTING

Allen R. Peterson, Dearborn, Mich., assignor to Welduction Corporation, Southfield, Mich., a corporation of Michigan Filed Aug. 30, 1960, Ser. No. 52,934
13 Claims. (Cl. 317—234)

This application pertains to the mounting of high-current-carrying crystal diodes to improve the dissipation of the heat which is generated during the operation thereof.

The object of this invention is to establish an improved heat transfer relation between the base of a crystal diode and a coolant.

Another object of this invention is to increase the intimacy of the heat transfer engagement between the base of a crystal diode and a crystal-diode mounting member which is in intimate heat transfer relation with a coolant.

A further object of this invention is to mount a plurality of high-current-carrying crystal diodes in intimate heat transfer relation with a coolant and in an integrated assembly while electrically insulating portions of those diodes from one another.

The manner of accomplishing the foregoing objects and other objects and features of the invention will become apparent from the following detailed description of an embodiment of the invention when read with reference to the accompanying drawings in which the single figure represents a side elevational view in partial section of a holder for a plurality of diodes embodying the principles of the present invention.

Referring to the drawing, the diode holder 10 is adapted to support a plurality of high-current-carrying crystal diodes 12, 14 and 16. Each of these diodes, such as the diode 12, comprises a heavy peripheral flange portion 18 normally in the form of a hexagonal metallic member to provide a portion for engagement by a wrench. A head portion 20 surmounts the peripheral flange portion 18 and supports an electrical conductor or lead 22.

The base portion 24 of the diode 12 is a hollow metallic member carrying the silicon or germanium diode structure therewithin one terminal of which is connected to the lead 22 and the other terminal of which is connected to the base 24. In the customary commercial practice, the base portion 24 is provided with an external thread adapted for threaded engagement with a threaded aperture in a mounting member.

The current-handling capabilities of crystal diodes of this type is determined and limited by the dissipation of the heat generated within the diode. It has been found upon investigation that the tolerances permitted in the manufacture of the threads on the diode and the mating threads in the mounting member are such that there is not normally a full depth of contact between the two threads. Further, when the diode is tightly threaded into the mounting, the forces tend to establish engagement substantially only between the following flange of the male thread and the abutting surface of the female thread, and it has been found in practice that only about 35% of the total area of the male thread on the crystal diode is in intimate heat-transfer engagement with the mounting member.

The present improved mounting for the crystal diodes requires that the crystal diodes have a tapered base portion 24. In a practical embodiment of the invention, the threaded base portion of the crystal diode was machined to a smooth frusto-conical form with a very light cut with a sharp tool and utilizing a good, volatile coolant such as carbon tetrachloride or trichlorethylene to a preselected taper, the constructed unit tapering from a diameter of about 0.955 inch at the large-diameter section adjacent the flange 18 to a diameter of about 0.912 inch at the lower end, the tapered portion being about 0.685 inch high, and the angle of the slope of the taper being about one degree and 47 minutes. Other tapers could, of course, be used. The machining operation must be executed with care since the developed heat level must be kept below that which would adversely effect the silicon or germanium diode contained within the cavity in the base portion 24.

As is illustrated in the drawing, the tapered base portion 24 of the diode 12 is inserted within the correspondingly tapered socket 26 in a diode holder 28. The socket 26 is illustrated to take the form of an aperture extending the longitudinal length of and through the holder 28. The holder 28 is preferably made of a fairly ductile metal having good heat and current conducting characteristics such as copper or brass. The wall portion 30, though sufficiently thick to afford good electrical conduction between base 24 and its mounting, is preferably sufficiently thin to permit that wall section to deform upon the insertion of the base portion 24 of the diode 12 therein to precisely conform to the surface shape of that base portion 24 so as to establish maximum surface engagement between the elements and to compensate for any machining errors.

The diode holder 28 projects through an aperture 32 in a thin metal wall 34 and is provided with a fairly heavy flange 36 which abuts the wall 34 around the periphery of the aperture 32. Desirably the flange 36 is silver soldered or otherwise sealed to the wall 34 to prevent the leakage of coolant through the aperture 32 and to improve electrical conductivity.

While the diode 12 can be simply wedge-fitted into the holder 28, it is preferred to provide clamping means such as a plurality of screws including screw 38 having threaded end portions threadedly engaging apertures formed in the flange 36 and head portions 40 either directly overlying and abutting the upper surface of the peripheral flange 18 of the diode 12, or, as shown, engaging the upper surface of a clamping ring 41 which in turn abuts the upper surface of the flange 18.

With the illustrated clamping means, diode 12 may be inserted in the holder 28 with a preselected force and then merely retained in that position by the clamping means or the clamping means may be utilized to drive the diode into seated engagement with the holder 28.

The wall 34 is one of a plurality of walls constituting a body 42 including the upper apertured wall 34, a bottom wall 44, the forward and rear walls (in the illustrated view) and left hand and right hand walls 46 and 48, all preferably formed of a metal such as brass. Walls 46 and 48 desirably have apertures 50 and 52, respectively, therein, and may be secured to the other walls of the body by any suitable means such as silver soldering.

Each of the other illustrated bodies 54 and 56 is similarly provided with apertures corresponding to apertures 50 and 52 therein. The several bodies 42, 54 and 56 are aligned end to end with the aperture 50 in the wall 46 of the body 42 aligned with the corresponding aperture in the body 54, and with the other aperture in the body 54 aligned with a corresponding aperture in the body 56. An electrical insulating sealing means in the form of a separator 58 is placed between the bodies 42 and 54 and may be manufactured of plastic such as Teflon, for example. Separator 58 is provided with an aperture 60 aligned with (but not necessarily the same size as) aperture 50 in the body 42. The presence of the partial wall portions, such as portion 46, at the end of the bodies, such as the body 42, increases the sealing area between the separator 58 and the body 42, it will be understood that the aperture in the end walls of the body may be coextensive with the size of the end wall, that is, the bodies may be tubular with open ends.

A similar separator 62 is placed between the bodies 54 and 56 and separators or insulators 64 and 66 are disposed at the other end of the bodies 42 and 56 respectively. Rigid end plates or bells 68 and 70 are mounted at the opposite ends of the assembly and are connected together by means such as a plurality of bolts such as bolt 72. The end plates 68 and 70 are provided with threaded ports 74 and 76, respectively, so that a coolant, such as water, may be flowed through the entire assembly.

It will be observed that with the aperture 26 extending through the holder 28, the base of the diode 20 is disposed in direct and intimate heat transfer relation with the flowing coolant and that the side walls of the base of the crystal diode are also in intimate heat transfer relation with the flowing coolant through the thin and highly conductive wall 30 of the holder 28.

Since the bodies 42, 54 and 56 are electrically insulated from one another by the separators 64, 58, 62 and 66, they may be individually provided with terminals such as terminal 78 for connection to a circuit. If the bases of the diodes are effectively electrically insulated from one another, as illustrated, then in the normal rectifier utilization, the several upper conductors including conductor 22 are normally connected together. Alternately, if it is desired to electrically interconnect the bases of the diodes, then the separators 58 and 62 may be omitted and the several metallic bodies 42, 54 and 56 either brought into intimate electrical engagement with one another or formed as a unitary tubular body. It will be observed that in the illustrated arrangement, to the degree that the coolant is conductive, there will be an electrical interconnection between the three bodies 42, 54 and 56. However, in the normal utilization of crystal diodes of this type, the voltage levels are low and the electrical leakage produced by this interconnection is not significant. If in another utilization the problem becomes serious, separate coolant flow paths may be utilized for each of the separate bodies.

A network of 70T30 type rectifiers manufactured by the International Rectifier Corporation of El Segundo, California, provided with threaded bases and which were rated, when used as a rectifier network in conjunction with the conventional threaded-socket cooling means, at 600 amperes were machined to have tapered bases, as illustrated, and associated with the illustrated mounting means and were found, by virtue of the improved heat transfer engagement between the diodes and the coolant, to be conservatively rated under the same conditions at 1020 amperes and to be capable of carrying over 1300 amperes.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In combination, a unitary, hermetically sealed high-current crystal diode having an integral smooth frusto-conical base portion and a heat dissipating mounting therefor comprising a hollow metal body having a plurality of walls defining a cavity therewithin, one of said walls having an aperture therein, port means for flowing coolant through said cavity in said hollow body, a metallic diode holder separate from said hermetically sealed diode and separate from said body and having an enlarged peripheral flange, means for mounting said diode holder with a side wall portion thereof seated in the aperture in said one wall and with the peripheral flange thereof in abutment with said one wall adjacent the aperture therein, and a frusto-conical socket in said separate diode holder conforming in taper and size to that of the frusto-conical base of the crystal diode, said integral base portion of said hermetically sealed diode being removably inserted in said frusto-conical socket in said separate diode holder.

2. The combination of claim 1 in which said side wall portion of said holder projects through said one wall of said body and into direct heat transfer relation with the coolant in said hollow body.

3. The combination of claim 1 wherein said socket in said holder is an aperture extending through said holder and in which a portion of said integral base portion of said crystal diode is in direct heat transfer relation with the coolant in said hollow body.

4. The combination of claim 1 in which the wall of said holder adjacent a portion of the aperture therein is relatively thin and deformable upon the insertion of the base of the crystal diode therein to conform to the shape of the frusto-conical base portion of the crystal diode.

5. The combination of claim 1 in which the diode base is surmounted by a peripheral flange and further including clamping means engageable with the peripheral flange of the crystal diode for holding the crystal diode in said socket with the frusto-conical base portion thereof in intimate full surface engagement with the wall of said frusto-conical socket in said diode holder.

6. In combination, a plurality of unitary high-current carrying hermetically sealed crystal diodes each having an integral smooth frusto-conical base portion surmounted by a peripheral flange, and a heat dissipating mounting therefor comprising first, second and third hollow metal bodies, each of said bodies having a plurality of walls, a liquid port in each of a first and a second of said walls of each of said bodies, an aperture in one of said walls of each of said bodies, a metallic diode holder secured in each of said apertures and each having a smooth frusto-conical socket therein conforming in taper and size to that of the frusto-conical base portions of the crystal diodes and adapted to accept and make direct full surface engagement with the frusto-conical base portion of one of the crystal diodes, an apertured insulating seal abutting said first wall of said first body and said second wall of said second body, an apertured insulating seal abutting said first wall of said second body and said second wall of said third body, means including electrical insulating means for clamping said first, second and third bodies in aligned relationship, and means for flowing coolant through the aperture in said second wall of said first body and through the aperture in said first wall of said third body.

7. The combination of claim 6 in which said one walls of said bodies are in a common plane, and in which each of said diode holders includes a peripheral flange engaging said one wall of the associated body adjacent the aperture therein.

8. The combination of claim 7 further including clamping means individual to each of said diode holders and engageable with the peripheral flange of the associated crystal diode for holding the associated crystal diode in said socket with the frusto-conical base portion thereof in intimate full surface engagement with the walls of said frusto-conical socket.

9. In combination, a unitary, hermetically sealed high-current crystal diode having an integral frusto-conical base portion and a heat dissipating mounting therefor comprising a hollow metal body having a cavity defined by a plurality of walls one of which is thinner than the height of the base portion of the crystal diode and has an aperture therein, port means for flowing coolant through said cavity, and metallic wall means effectively thermally integral with said body and defining a socket coaxial with said aperture in said wall and conforming in taper to said integral base of said crystal diode and projecting inwardly into said cavity from said one wall and adapted to removably accept said integral base portion of the diode and having an exterior surface in said cavity engageable with the coolant, said integral base portion of said hermetically sealed diode being removably inserted in said socket in said metallic wall means.

10. The combination of claim 9 in which said wall means defines a socket which opens into said cavity to expose the bottom surface of said diode base portion directly to the coolant.

11. The combination of claim 10 in which the length of the tapered aperture defined by said one wall and wall means is shorter than the height of the base portion of said diode.

12. The combination of claim 9 in which said metallic wall means is sufficiently thin to deform upon the insertion of said integral base portion of said diode to conform to the surface shape thereof and to provide a good short-path heat transfer relation between said integral base portion of said diode and the coolant.

13. The combination of claim 12 in which said frustoconical base portion and said socket are both smooth.

References Cited by the Examiner

UNITED STATES PATENTS

| | | | |
|---|---|---|---|
| 2,780,757 | 2/57 | Thornhill et al. | 317—234 |
| 2,783,418 | 2/57 | Peter et al. | 317—234 |
| 2,942,165 | 6/60 | Jackson et al. | 317—234 |
| 3,018,424 | 1/62 | Colaiaco | 317—234 |

SAMUEL BERNSTEIN, JAMES D. KALLAM, *Examiners.*